United States Patent Office 2,751,506
Patented June 19, 1956

2,751,506

WEAR TEST METHOD

James F. Black and Ernest V. Wilson, Roselle, N. J., assignors to Esso Research and Engineering Company, a corporation of Delaware No Drawing. Application December 29, 1953,
Serial No. 401,077

3 Claims. (Cl. 250—83.6)

This invention relates to a method for determining the extent of deterioration of metallic objects and more particularly relates to a method for simultaneously determining the extent of deterioration of each of two iron-containing metallic objects by radioactive techniques.

Wear tests are utilized to determine the wearing characteristics of various mechanical systems and are also utilized to determine the effectiveness of lubricants employed with these mechanical systems. For example, extensive testing has been conducted to measure the extent of wear of piston rings, cylinder liners, ring and pinion gears, cam and cam followers, etc., to determine not only the suitability of the material from which the metallic objects are constructed but also to determine the suitability of various lubricants employed with such metallic objects.

One particular well-known method of determining the extent of deterioration of metallic objects in a wear test is to ash the lubricant upon completion of the wear test and thereafter to determine quantitatively by chemical analysis the amount of metal worn from the metallic object by chemical techniques. Another well-known method for determining the extent of wear of metallic objects is to weigh, or measure the dimensions of, the metallic objects before and after the wear test. These methods, however, have a number of disadvantages. One obvious disadvantage is that it is not possible to run the wear test continuously since the determination of the extent of wear can be made only upon the cessation of the wear test. A further disadvantage is that these methods are ineffective to determine minute amounts of wear due to the inherent inaccuracies in determining small quantities or slight changes in dimensions. Thus, in order to produce significant wear results in many instances, it has been necessary to conduct the wear test for a considerable length of time, which is, of course, economically unattractive.

Recently, several methods involving radioactive techniques have been developed for measuring the extent of wear of a metallic object. These methods involve employing a metallic object in the wear test which contains a radioactive material, and subsequently measuring the radioactivity of the lubricant to thereby determine the extent of wear of the metallic object on the basis that the worn metal including a proportional amount of the radioactive material is carried in the lubricant. In these prior methods, the metallic object may be made radioactive by a number of different methods. In one method, a radioactive substance is incorporated into the metallic object when it is being cast. Another method is to deposit or electroplate a metallic film containing a radioactive isotope on the surface of the metallic object, then to heat the metallic object so that the radioactive isotope diffuses into the metallic object to an appropriate depth and thereafter to strip off the film from the surface of the metallic object leaving the diffused radioactive isotope in the metallic object. A still further method employing radioactive techniques is to bombard the metallic object, for example, in a cyclotron to impart radioactivity into the object. The use of these radioactive techniques has made possible a method of analysis for wear which is adaptable for use on a continuous basis as well as providing a suitable method for measuring small quantities of wear.

Heretofore, however, no method has been developed for simultaneously, and individually, measuring the extent of wear of each of two mutually lubricated iron-containing metallic objects by radioactive techniques in a single wear test. Very often in wear tests it is desirable to measure the extent of wear of each of two objects simultaneously in the same test to thereby determine the wear of both under the same operating conditions. The present invention concerns such a method wherein commercially available metallic objects may be employed in a continuous wear test so that the extent of wear of each of two metallic objects may be simultaneously determined. Thus the present invention is ideally suited to simultaneously determine the extent of wear of, for example, piston rings and cylinder liners, ring and pinion gears, cam and cam followers, different piston rings, etc. in a single wear test.

Briefly, the present invention comprises irradiating the two iron-containing metallic objects by bombardment with neutrons to produce radioactive $Fe^{55}$ and $Fe^{59}$ isotopes in the iron-containing metallic objects. This irradiation of the two metallic objects is carried out at different times so that the radioactivity in one of the objects is allowed to decay prior to the wear test. In accordance with the present invention therefore the metallic object which is first irradiated is aged to substantially eliminate the $Fe^{59}$ isotope which has a relatively short half life so that the radioactivity of the aged metallic object is primarily due to the radiation from the $Fe^{55}$ isotope. The two metallic objects are then subjected to a wear test in which they are mutually lubricated by a common lubricant. The lubricant is then analyzed by separately measuring the gamma radiation due to the $Fe^{59}$ isotope in the lubricant with a thick-walled radiation counter and then separately measuring the X-radiation due to the $Fe^{55}$ isotope and the beta radiation due to the $Fe^{59}$ isotope in the lubricant with a thin window or windowless radiation counter to therefrom determine the amount of wear of each of the two metallic objects.

An object of this invention is to provide a method for simultaneously determining the extent of deterioration of each of two iron-containing metallic objects in a single wear test.

A further object of this invention is to provide a method for continuously determining the extent of deterioration of each of two iron-containing metallic objects simultaneously in a single wear test.

Naturally occurring iron may be bombarded with neutrons in a radiation pile to produce radioactive iron isotopes, namely $Fe^{53}$, $Fe^{55}$, and $Fe^{59}$, of which $Fe^{55}$ and $Fe^{59}$ are the isotopes of interest in the present invention. Because $Fe^{53}$ has a half life of only about nine minutes, its radioactivity upon cessation of the neutron bombardment will rapidly disappear. $Fe^{59}$ has a half life of about forty-six days so that after a period of about 2–6 months, its radioactivity will be substantially eliminated from the iron object which was bombarded in the neutron pile. On the other hand, $Fe^{55}$ has a half life of about 2.9 years so that after about 2–6 months almost the original amount of radiation will still be emitted from the $Fe^{55}$ in the iron object.

$Fe^{59}$ decays by emitting 1.1 and 1.3 m. e. v. (million electrons volts) gamma rays and, in addition, 0.46 and 0.26 m. e. v. beta rays to produce $Co^{59}$ as the ultimate product of decay. $Fe^{55}$ decays by K capture giving an X-ray of 6 k. e. v. (thousand electron volts) to produce $Mn^{55}$ as the ultimate product of decay.

The maximum activity which can be produced per gram of iron by irradiation of the iron object with neutrons is defined by the formula:

$$A_{max.} = G \times N \times F$$

where G is equal to the cross section of the isotope in cm.², N is equal to the number of atoms of isotope per unit wt., and F is equal to the neutron flux of the neutron pile measured in terms of neutrons/cm.²/sec. For $Fe^{59}$, $G = 8 \times 10^{-25}$ and $$N = \frac{0.0033 \times 6.02 \times 10^{23}}{55.85}$$

so that when assuming the neutron flux available from the neutron pile employed in bombarding the iron object is equal to $10^{12}$ neutrons/cm.²/sec., the maximum activity of radioactive $Fe^{59}$/gm. of iron irradiated is equal to about 0.7 mc. (millicuries). A millicurie is equal to $\frac{1}{1000}$ of a curie and a curie is the standard unit of measurement of the number of atoms disintegrating in a sample per minute, or, in other words, a curie is the standard measure of intensity of radiation. One curie of activity is defined as $2.2 \times 10^{12}$ atom disintegrations/minute so that one millicurie is equal to $2.2 \times 10^{9}$ disintegrations/minute. For $Fe^{55}$, $G = 7 \times 10^{-25}$ and $$N = \frac{0.059 \times 6.02 \times 10^{23}}{55.85}$$

so that when employing a neutron flux of $10^{12}$ neutrons/cm.²/sec., the maximum activity of $Fe^{55}$ produced in the neutron pile/gm. of iron irradiated is equal to about 12 mc.

Because a considerable period of time is required to produce the maximum activity of each isotope, normally the iron object is placed in the neutron pile for a period shorter than the time required to produce maximum activity. The activity, A, of iron isotopes after irradiation is a neutron pile for time $t$ is defined by the formula:

$$A = A_{max.} \left(1 - e^{\frac{-0.693t}{t_{1/2}}}\right)$$

where $t_{1/2}$ = half life of the isotope and $e$ is the base of the natural system of logarithms. The following is a tabulation of the activities of the $Fe^{55}$ and $Fe^{59}$ isotopes in terms of mc./gm. of iron object irradiated, after irradiation of two iron objects in the aforementioned neutron pile, one for a period of 60 days and the other for a period of 120 days, as calculated from the above formula:

Table I

| Period of Irradiation | Activity of Iron Isotopes in Millicuries/Gm. | |
| --- | --- | --- |
| | $Fe^{55}$ | $Fe^{59}$ |
| 60 days | 0.46 | 0.42 |
| 120 days | 0.91 | 0.58 |

If the two iron objects shown in Table I are each aged for a period of six months, the radioactivity of the $Fe^{55}$ and $Fe^{59}$ isotopes of the two iron objects will be reduced to the following values:

Table II

| Period of Irradiation | Activity of Iron Isotopes in Millicuries/Gm. | |
| --- | --- | --- |
| | $Fe^{55}$ | $Fe^{59}$ |
| 60 days | 0.41 | 0.03 |
| 120 days | 0.80 | 0.04 |

Thus, it will be seen that after aging for six months, the radiation from the $Fe^{59}$ has been substantially eliminated while the radioactivity of the $Fe^{55}$ has been reduced only a very small amount. This difference makes it possible to simultaneously measure the extent of wear of two mutually lubricated iron-containing metallic objects in a single wear test by employing one iron-containing metallic object which is unaged, or aged for only a very short time, and another iron-containing metallic object which is aged for a substantial period of time. It is preferable from an analytical standpoint to utilize metallic objects having a substantial difference in $Fe^{59}$ content. However, this factor must be compromised with the problems involved in aging metallic objects for long periods of time.

In accordance with the present invention, a sample of the oil being employed to lubricate the two iron-containing metallic objects in the wear test is withdrawn from the testing apparatus. A thick-walled counter, such as a Geiger-Mueller counter, is then immersed in the sample of the lubricant so as to measure the intensity of the high energy gamma rays produced from the decay of the $Fe^{59}$ isotope. The beta radiation from the $Fe^{59}$ and the X-ray radiation from the $Fe^{55}$ will not penetrate the thick-walled counter and as a result will not be detected by the thick-walled counter. A second counter which is a thin window counter such as a counter which has a mica window weighing about 1.5 mg./cm.² of area is then placed close to the surface of a sample of the lubricant to thereby measure the intensity of the X-rays emitted from the $Fe^{55}$ isotope and the beta rays emitted from the $Fe^{59}$ isotope. In such a measurement, the gamma rays emitted by the $Fe^{59}$ isotope will not be measured to any appreciable extent due to their high energy. As an alternative step for the measurement of the X-rays and beta rays, the oil sample may be ashed and the ash counted in a windowless counter. Thus, for low wear tests it might be advantageous to concentrate the activity being measured by ashing an appreciable volume (e. g. 100 cc.) of the sample. However, it is preferable to employ a thin window counter when possible so that the measurements may conveniently be made in a continuous wear test.

The following specific example is intended to illustrate the method of the present invention. In this example the amounts of wear of an iron-containing cylinder liner and the iron-containing piston rings associated with said cylinder liner are to be determined simultaneously in an engine wear test. The cylinder liner and piston rings are mutually lubricated by a common oil bath. The cylinder liner prior to this test has been irradiated in a neutron pile having a neutron flux of $10^{12}$ neutrons/cm.²/sec. for a period of 60 days and has been aged for six months. A 100 mg. standard sample of the same composition as the cylinder liner has been similarly conditioned. The piston rings prior to this test have also been irradiated in the same neutron pile for a period of 60 days and are removed from the neutron pile just prior to this wear test. A 100 mg. standard sample of the same composition as the piston rings has been similarly conditioned.

The cylinder liner and piston rings are assembled for the wear test and 1000 cc. of a hydrocarbon lubricating oil are placed in the oil bath which will mutually lubricate the cylinder liner and piston rings and the wear test is begun. In the meantime the 100 mg. standard sample of the cylinder liner is dissolved in 100 cc. of dilute hydrochloric acid and the resultant standard solution is placed in a 100 cc. counting cell which is suitably shielded from external radiation. The tube of a thick glass wall dip counter having a wall density of about 300 mg./cm.² is then immersed in the solution and a measurement of $2.22 \times 10^{3}$ counts/sec. is recorded for the standard sample of the cylinder liner. This reading is equivalent to about 22 counts/sec./mg. The thick-walled radiation counter is then removed from the counting cell and a thin window radiation counter with an end window of mica having a density of about 1.5 mg./cm.² of area is placed above the surface of the liquid in the counting cell. A measurement of $3.04 \times 10^{4}$ counts/sec. is recorded for the standard sample of the cylinder liner and this reading is equivalent to 304 counts/sec./mg. The thin-window radiation counter is then removed from the counting cell and the counting cell is thoroughly cleaned to remove all traces of radioactivity from the standard solution of the cylinder liner.

Then the 100 mg. standard sample of the piston rings is dissolved in 100 cc. of dilute hydrochloric acid and the resultant standard solution is placed in the 100 cc. counting cell. The tube of the thick-walled radiation counter is immersed in the solution and a measurement of $3.10 \times 10^4$ counts/sec. is recorded for the standard sample of the piston rings. This reading is equivalent to 310 counts/sec./mg. The thick-walled radiation counter is removed from the counting cell and the thin-window radiation counter is positioned above the surface of the liquid in the counting cell. A measurement of $3.40 \times 10^4$ counts/sec. is recorded for the standard sample of the piston rings and this reading is equivalent to 340 counts/sec./mg. The thin-window radiation counter is then removed from the counting cell and the counting cell is thoroughly cleaned to remove all traces of radioactivity from the standard solution of the piston rings.

When it is desired to measure the amounts of wear of the cylinder liner and the piston rings as a result of the wear test, a 100 cc. sample of the oil from the oil bath is removed and placed in the counting cell. In this example, the 100 cc. sample is taken after the wear test has been running for three hours. The tube of the thick-walled radiation counter is then immersed in the oil sample and a measurement of 71 counts/sec. is recorded. The thick-walled radiation counter is then removed and the thin-window radiation counter is positioned above the surface of the oil sample. A reading of 190 counts/sec. is recorded with the thin-window counter.

The equation for gamma radiation is thus:

$$22L + 310R = 71(10)$$

where "L" is equal to the mg. of wear of the cylinder liner and "R" is equal to the mg. of wear of the piston rings, and the equation for the X-ray and beta radiation is:

$$304L + 340R = 190(10)$$

Solution of the equations gives the results that the amount of wear of the cylinder liner has been 4 mg. and the amount of wear of the piston rings has been 2 mg. The actual counts determined by the counters are multiplied by a factor of 10 as the oil sample from the oil bath which was measured in the counting cell was only $\frac{1}{10}$ of the total oil employed in the wear test. It is to be understood that the irradiation procedure for making the mechanical elements radioactive could have been reversed. Thus the piston rings could have been irradiated and aged while the cylinder liner was irradiated and not aged.

The above outlined procedure is ideally suited for determining the extent of wear of piston rings and cylinder liners in an engine wear test. Commercially available rings and liners may be employed in such a test. However, in the method of this invention it is essential, when iron alloys are employed, to utilize iron alloys in which the metal alloyed with the iron either does not form radioactive isotopes or else forms radioactive isotopes with short half lives or low intensity. Thus, if the iron is alloyed with nickel, for example, it is advisable to age the relatively unaged metallic object for at least several days to substantially eliminate the radioactive isotopes of nickel which have short half lives. When employing the method of this invention in an engine wear test, it is possible to study the wear of many different combinations of rings and/or liners. Thus, for example, two rings in one cylinder could be separately studied in one test, or one ring in one cylinder and the liner associated with that cylinder could be separately studied in one test, etc. Many other possible combinations will be apparent to those skilled in the art.

The method of the present invention may be also advantageously employed to measure the corrosive effect of a liquid on two separate iron-containing metallic objects placed in the liquid. Other applications of the method of this invention will be apparent to those skilled in the art. The method may be used, in fact, to separately determine the deterioration of any two iron-containing objects which are exposed to a common liquid in a single deterioration test. The method may be made continuous by passing a small representative sample of the liquid continuously through a counting cell containing a thick-walled and a thin-window counter for measurement of the radiation from the liquid. The liquid after passing through the counting cell is returned to the main body of liquid in contact with the metallic objects. Two separate counting cells may be employed in series if desired in a continuous process.

The period of irradiation which is required will depend upon the flux of the particular neutron pile employed, the percentage of iron in the metallic objects and the sensitivity of the radiation counters available as well as the amount of deterioration expected in the wear test. Normally the radioactivity of the liquid should produce at least about 10 counts/min. to assure reasonable counting accuracy in a reasonable length of time. The differences in irradiation and aging times necessary for the two objects should be such that the intensity of radiation from the $Fe^{59}$ in one of the objects is at least about twice as much as the intensity of radiation from the $Fe^{59}$ in the other of the two objects.

What is claimed is:

1. A method of determining wear of interacting surfaces of two iron containing objects, comprising irradiating a first one of said objects by bombardment with neutrons to produce $Fe^{59}$ and $Fe^{55}$ isotopes in said first object, aging said first irradiated object for a period to reduce substantially the $Fe^{59}$ isotope content thereof by radioactive decay, irradiating the second one of said objects by bombardment with neutrons to produce $Fe^{59}$ and $Fe^{55}$ isotopes in said second object, then without substantially aging of said second object, subjecting said objects to interacting surface wear one with another in the presence of a liquid capable of receiving and carrying wear debris from the surfaces of said objects measuring the intensity of X-radiation and beta radiation from said liquid produced by wear debris contained therein, which debris includes $Fe^{55}$ and aged $Fe^{59}$ isotopes from said first object, and separately measuring the intensity of gamma radiation from said liquid produced by wear debris contained therein which debris includes the unaged $Fe^{59}$ isotope from said second object, each of said measurements substantially excluding the measurement of radiation produced by wear debris from one of said objects.

2. A method according to claim 1 wherein one of said objects is an engine piston ring, the other of said objects is an engine cylinder liner and said liquid capable of receiving and carrying wear debris from surfaces of said objects is an engine lubricating oil.

3. The method of claim 1 in which the intensity of radiation from said $Fe^{59}$ in said second object is at least about twice the intensity of radiation from said $Fe^{59}$ in said first object after aging.

References Cited in the file of this patent
UNITED STATES PATENTS

| | | |
|---|---|---|
| 2,206,634 | Fermi et al. | July 2, 1940 |
| 2,315,845 | Ferris | Apr. 6, 1943 |

OTHER REFERENCES

"Isotopes: Radioactive, Measurement," Evans. Reprinted from Medical Physics, Otto Glasse, Editor. Year Book Publisher 1944, pp. 643–657.